Oct. 13, 1942.  V. DAHLMAN  2,298,469
DIFFERENTIAL PRESSURE CONTROL MECHANISM
Filed March 27, 1941  2 Sheets-Sheet 1

VERNER DAHLMAN
INVENTOR

BY Arthur Robert
ATTORNEY

Oct. 13, 1942.    V. DAHLMAN    2,298,469
DIFFERENTIAL PRESSURE CONTROL MECHANISM
Filed March 27, 1941    2 Sheets-Sheet 2

VERNER DAHLMAN
INVENTOR

BY Arthur H. Robert
ATTORNEY

Patented Oct. 13, 1942

2,298,469

UNITED STATES PATENT OFFICE 2,298,469

DIFFERENTIAL PRESSURE CONTROL MECHANISM

Verner Dahlman, Louisville, Ky., assignor to American Air Filter Company, Inc., Louisville, Ky., a corporation of Delaware Application March 27, 1941, Serial No. 385,461

14 Claims. (Cl. 200—84)

It has been proposed to control the operation of automatic dry filters, for example, wherein a sheet-like filter medium is intermittently fed into one end of the path extending across the air flow and simultaneously removed from the other end thereof, by means of a mercury switch actuated through the agency of a float control mechanism which is responsive to changes in the pressure drop across the medium.

Control arrangements of this character have not been satisfactory due to the difficulty of obtaining precise or accurate regulation within the extremely narrow limits of movement to which the float should be confined. For example, the minimum or clean resistance of the general run of dry filter mediums, as measured by the pressure drop across the medium ranges between .07 and .10 inch of water column. The maximum or "dirty" resistance of such mediums, being limited by the maximum variation or drop permitted in the air flow, should preferably not be permitted to exceed .40 inch of water column. The maximum pressure drop variation, therefore, approximates only .30 inch of water column, one half of which represents the maximum movement of the float. The mechanical difficulty of obtaining accurate regulation with a float movement approximating .15 inch can be readily appreciated. To this difficulty is added the operating error occasioned by changes in height of the liquid column upon variations in temperature.

I have discovered, however, that with the proper selection and arrangement of switch and float mechanism, it is not only possible to secure precise and accurate regulation within the narrow limits of float movement above mentioned, but extremely practical to secure precise regulation within limits so much narrower as to bring air flow variations within limits of minor consequence. Such forms the principal object of this invention.

Another important object of the invention is to eliminate operating errors due to variations in temperature.

Another important object is to accomplish the foregoing objective in a compact device which is simply constructed and yet positive in operation.

Another object is to provide a novel mechanical arrangement for transmitting switch actuating movement through a solid wall of a housing without introducing noticeable operating errors due to pressure differential or other factors.

The invention is illustrated in the accompanying drawings wherein.

Figure 1:
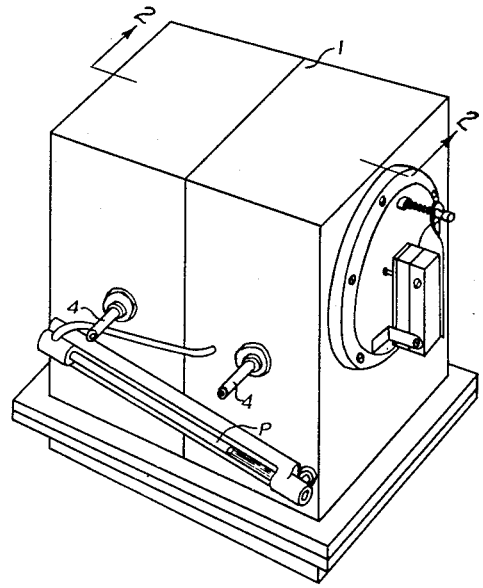
Figure 1 is a perspective view of one embodiment of the invention.
Figure 2:
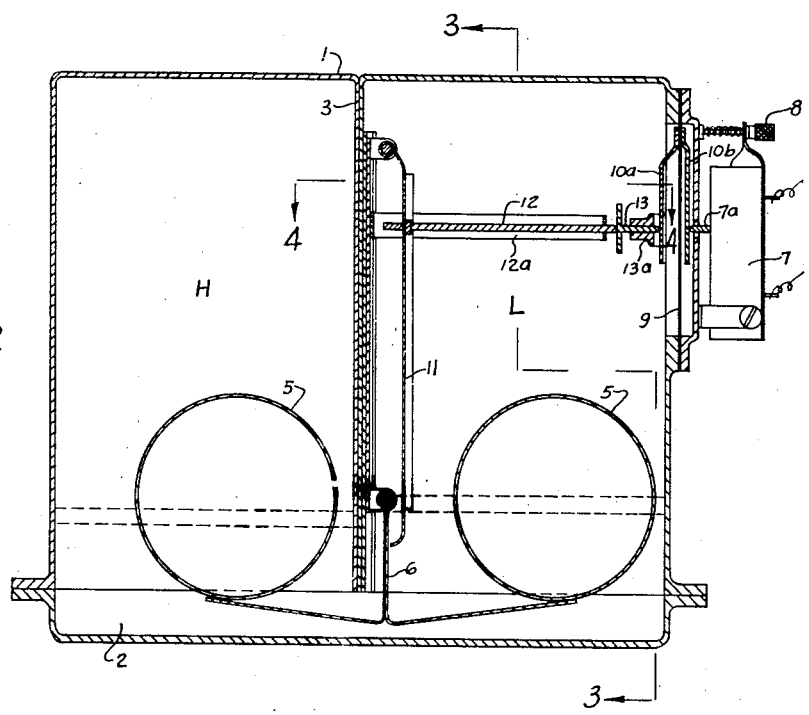
Figure 2 is a vertical section corresponding to one taken along line 2—2 of Figures 1 and 3.
Figure 4:
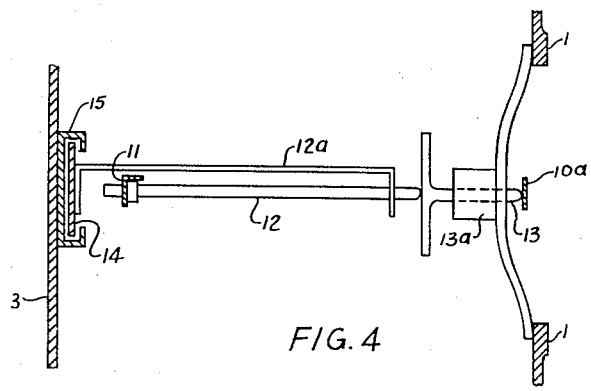
Figure 4 is a fragmentary section taken along line 4—4 of Figure 2.
Figure 5:
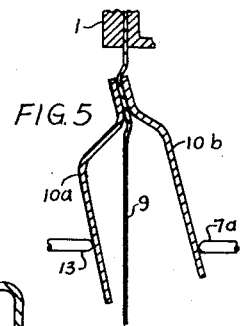
Figure 5 is a fragmentary section exaggerated to illustrate the manner by which motion is transmitted through a solid wall of the housing containing the float mechanism.
Figure 3:
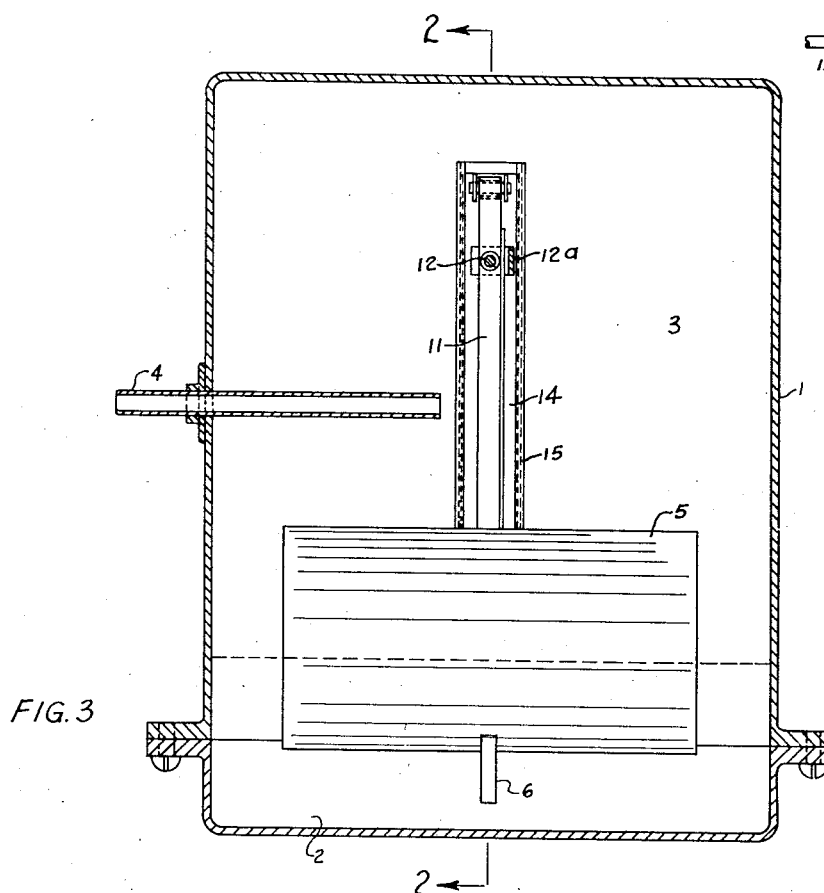
Figure 3 is a vertical section taken along line 3—3 of Figure 2.

I have found that precise control can be readily obtained by connecting a float control mechanism to a stiff micrometric snap switch through an interposed linkage which steps down the degree of movement, derived from the float, to the micrometric proportions required by the switch.

The float control mechanism illustrated comprises a casing 1 having a relatively shallow liquid bath 2 at its bottom. The interior of the casing is divided by suitable partition means 3 into high and low-pressure chambers H and L. The partition means terminates slightly above the bottom of the casing to provide an opening through which the chambers H and L communicate, this opening being sealed by the bath. The chambers H and L may be connected respectively to high and low pressure areas by any suitable means such as the conduits 4. These conduits preferably are arranged to penetrate their respective chambers more or less centrally to a depth sufficient to prevent the drainage of the bath material through the conduits in any position of the casing. In this way, shipment of the control mechanism, with the bath material in the casing, is facilitated. If desired, a pressure gauge P may be mounted on the casing and connected to chambers H and L.

A pair of cylindrically shaped hollow floats 5 is arranged in the casing 1, one in each pressure chamber. These floats are secured to opposite ends of the inverted T 6 to form a rigid assembly which is rotationally mounted upon the casing by connecting the upper end of the T pivotally to the partition means 3. With this arrangement, the assembly moves angularly in response to liquid level changes, occasioned by differential pressures, and its angular movement is used to actuate a micrometric snap switch 7.

The term "stiff micrometric snap switch" designates a type of switch requiring the application of considerable torque or force to move its operating element over the micrometric range to snap the switch from one position to another. One suitable type of stiff micrometric snap switch is disclosed in Patent #1,960,020. In switches of this type, a movement in one direction approximating .002 inch serves to snap the switch "on" while the reverse movement of the same order is required to snap it "off." It thus has a more or less fixed range of micrometric movement and operates only at the limits of that range. Since suitable forms of micrometric switches are well known and available on the market, a detailed illustration or description thereof is unnecessary.

While the switch 7 may be mounted within the casing 1, it preferably is mounted on an outer wall thereof in order to render it readily accessible for inspection and adjustment purposes. Accordingly, it is adjustably held in any of a range of relatively fixed positions by pivotally securing its lower end to the outer wall while resiliently forcing its upper end outwardly against an adjustable stop 8. The switch contains an operating element in the form of an actuating button 7a which snaps the switch "on" and "off" respectively when pushed inwardly and permitted to move outwardly a distance approximating .002 inch.

In further accordance with this invention, a novel mechanism is provided to transmit a switch actuating movement from the inside of the casing 1 through the solid wall upon which the switch is mounted. This mechanism comprises a diaphragm 9 sealing an opening in the wall of casing 1, and carrying a pair of levers 10a and 10b, one on each face. The diaphragm 9, while flexible, bendable or distortable, should be stiff enough, when mounted, to resist bulging due to pressure differentials existing between the inner and outer faces. Preferably it is made non-distensible, that is to say of a character such that it will not bulge under pressure differentials but simply ruptures when the differentials exceed its capacity. For example, the invention contemplates the use of an imperforate metal disc which is so thin as to be somewhat limp in character but which, when stretched across the opening of the casing and provided with levers 10a and 10b, can be easily distorted to transmit motion and yet will not bulge or dish in one direction or another when subjected to pressure differentials. The inner and outer levers 10a and 10b are rigidly secured at one end to opposed face portions of the diaphragm 9 and extend therefrom outwardly a slight distance and then more or less in spaced parallel relation along the diaphragm.

When the free end portion of the inner lever 10a is pressed toward the diaphragm, its secured end distorts or bends the adjacent portion of the diaphragm and, in doing so, causes the outer lever 10b to swing outwardly, depressing the button 7a to snap switch 7 to its "on" position. As the pressure on lever 10a is removed, it, and its associated parts, will return to their original positions, thereby permitting button 7a to return to its initial position where the switch snaps "off."

The linkage connection between the float and switch is designed not only to step down the movement of the float to an extent depending upon the degree of regulation desired but to increase the torque to the degree necessary to operate the switch. For example, if we assume the range of switch movement to be .002 inch and the range of float movement to be .15 inch, which obtains when the pressure drop across the medium ranges between .10 and .40 inch of water column, then the linkage will be designed to step down movement at a ratio of .15 to .002 or 75 to 1, while the floats 5 will be proportioned to produce the operating torque necessary with this ratio. Since closer regulation is desired and since a device constructed in accordance with my invention will provide effective regulation when the float movement approximates values as low as .025, the linkage may be designed to step down movement at a ratio as low as .025 to .002 or 12.5 to 1 and still provide ample torque with a relatively small size of float.

While any suitable form of step-down linkage may be provided, the form shown comprises a vertically arranged lever 11 rotationally mounted upon the casing 1 by connecting its upper end pivotally to the partition means 3. Its lower end is positioned to rest against the T 6 at a point spaced below the pivot of the T, a distance determined by the step-down ratio employed. The lever 11 is connected, at an intermediate point also determined by the step-down ratio, to lever 10a on the diaphragm 9 through an intermediate linkage comprising, in the embodiment shown, links 12 and 13 horizontally arranged in end-to-end relation. The free end of link 12 is slidably supported in bracket 12a while the entire link 13 is bodily supported in a slidable manner by the bracket 13a. With this arrangement, the angular motion of the float assembly is not only stepped down but also translated into substantially rectilinear motion.

In operation—assuming that a clean filter medium, a step-down linkage having a 20 to 1 ratio and a micrometric switch having a range of .002 inch but not yet adjusted into its desired position, are all employed—it will be apparent that when the air flow is instituted, the pressure drop across the clean filter medium will rise from its initial resistance, of say .10 inch, at a rate depending upon the rate at which dirt is collected by the medium. When the pressure drop across the medium increases to the maximum value desired, say .40 inch, the stop 8 may then be adjusted to the point at which the switch is snapped into the "on" position so as to institute the feeding of clean filter medium into the air flow. As more and more clean medium enters the air flow, the pressure drop across the medium begins to fall, decreasing the liquid level differential between chambers H and L and thereby causing the float, step-down linkage and the switch button 7a to retract toward their original positions. With a step-down ratio of 20 to 1 and a micrometric switch range of .002, the pressure drop must fall .08 inch before the parts reach the position at which the micrometric switch is snapped off. When this occurs, the feeding action ceases. Thereafter, the control mechanism will operate to hold the pressure drop between .32 and .40 inch.

Since this extremely small range of pressure drop corresponds to a float movement of .04 inch, it will readily be appreciated that slight variations in the height of the liquid bath, due to variations in temperature, will create substantial operating errors in the accuracy of regulation. The present invention, however, contemplates the elimination of operating errors due to temperature variations. This is accomplished by supporting the float assembly and a part of the step-down linkage bodily upon the liquid bath and slidably connecting them, as a unit, to the casing so that they will rise and fall with the expansion and contraction of the liquid bath while slidably connecting the floating and nonfloating parts of the linkage to each other along a vertical plane so that the vertical movement of one part has no effect on the other. To this end, the T 6, vertical lever 11 and intermediate bracket 12a are bodily secured as a unit to a carrier 14 which is slidably arranged in the vertical guideway of a guide member 15 on the partition means 3. The relative variation in elevation between the switch 7 and the vertically movable portion of the step-down linkage is accommodated through the use of separate intermediate links 12 and 13 and the provision therebetween of a vertically slidable connection, which permits one link to move vertically relative to the other without altering or otherwise interfering with the transmission of motion from the float assembly to the switch.

While invention has been explained in connection with its use as a control for an automatic dry filter, it is, of course, apparent that it may be adapted to a wide variety of uses and that it is particularly suited for use where the operating pressure differentials are relatively small. Furthermore, while the elimination of the temperature error in the float control is an important feature of the present invention, it is not an essential feature where the use of the control mechanism does not subject it to important temperature variations.

I claim:

1. A float control mechanism comprising: a casing having a U-shaped inner space, a liquid bath partially filling the U, and connections for placing the space above the bath in each leg of the U in communication with different pressure areas to cause the liquid levels in said legs to vary in accordance with variations in the pressure drop between areas; a float assembly including a float in each leg of the U and connecting linkage between said floats extending through the bight of said U into both legs and pivoted to said casing for relative angular movement in response to variations in said liquid levels in said legs; and a pressure drop control element operatively connected to said float assembly for operation by it between control positions corresponding to different liquid levels.

2. A float control mechanism comprising: a casing having compartments communicating with each other through an opening sealed by a liquid bath and arranged for communication with different pressure areas to cause the liquid levels in said compartments to vary in accordance with variations in the pressure drop between areas; a float assembly including a float in each compartment and connecting linkage between said floats extending through said sealed opening into both compartments and pivoted to said casing for relative angular movement in response to variations in said liquid levels; and a pressure drop control element operatively connected to said float assembly for operation by it between control positions corresponding to different liquid levels in said compartments.

3. The mechanism defined in claim 2 wherein the arrangement for establishing communication between the compartments and the different pressure areas includes a pair of nipples mounted on the casing, one for each compartment, each nipple being arranged to penetrate its compartment at a position and to a depth sufficient to space its inner end from the bath in any position of the casing and thereby prevent accidental drainage of bath liquid through either nipple.

4. The mechanism of claim 2 wherein said float assembly includes: a float in each compartment; and an inverted T pivotally depending from the casing with its lateral ends repectively connected to said floats said pressure drop control element being operatively connected to the central leg of said T.

5. A mechanism for operatively connecting a control element, mounted outside of a casing having a liquid bath, to a float assembly mounted within the casing for movement in response to variations in the bath level comprising: a distortable diaphragm forming part of the casing wall and being sufficiently rigid to avoid bulging when its inner and outer faces are normally subjected to different operating pressures; inner means for distorting the diaphragm in response to assembly movement; and outer means for communicating the distortion of the diaphragm to the control element to operate the latter.

6. The mechanism of claim 5 wherein the inner means comprises: an inner lever secured at one end to an inner face portion of said diaphragm and operatively connected to the assembly, at a point spaced from its secured end, to distort the diaphragm in response to assembly movement.

7. The mechanism of claim 5 wherein the outer means comprises: an outer lever secured at one end to an outer face portion of the diaphragm which is subject to distortion, the lever being operatively connected to the control element, at a point spaced from its secured end, to operate the element in response to diaphragm distortion.

8. The mechanism of claim 2 wherein said control element its mounted on the outside of said casing and said operative connection between the element and the assembly includes: a distortable diaphragm forming part of the casing wall and being sufficiently rigid to avoid bulging when its inner and outer faces are normally subjected to different operating pressures; and inner and outer levers, each rigidly secured at one end respectively to opposed inner and outer face portions of the diaphragm, and each operatively connected at a point spaced from its secured end respectively to the assembly, to distort the diaphragm in response to assembly movement, and to the control element, to operate the element in response to diaphragm distortion.

9. A float control mechanism comprising: casing means having a pair of liquid columns arranged for communication with different pressure areas, the column levels rising and falling with each other due to corresponding temperature changes in their liquids and inversely to each other due to pressure changes between areas; a float assembly, presenting a float in each column, arranged to move vertically with temperature changed levels and angularly with pressure-changed levels; a control element operable between control positions corresponding to pressure-changed levels; and means for operating the control element, said means including connecting means transmitting movement, derived from the angular movement of said assembly in one direction, to operate the control element in one direction, said connecting means being operable independently of the vertical movement of the assembly.

10. The mechanism defined in claim 9 wherein the angular and vertical movements of said assembly are accommodated by pivotally mounting the assembly upon a carrier and slidably mounting the carrier upon the casing.

11. The mechanism defined in claim 9 wherein: the angular and vertical movements of said assembly are accommodated by pivotally mounting the assembly upon a carrier and slidably mounting the carrier upon a casing; and the independent operation of the connecting means is accommodated by mounting an assembly actuated section thereof upon the carrier and another section upon the casing in position to be actuated horizontally by the assembly section in all of its vertical positions.

12. A float control mechanism comprising: a casing having a liquid bath and a partition vertically dividing its interior into adjacent compartments which communicate with each other through a bath sealed opening adjacent the lower end of the partition, the compartments being arranged above bath levels for communication with different pressure areas, the compartment bath levels rising and falling with each other due to temperature changes in the bath and inversely to each other due to pressure changes between areas; a vertically movable carrier slidably mounted on the partition; a float assembly, presenting a float in each column, pivotally depending from the carrier to move vertically with temperature changed levels and angularly with pressure changed levels; a control element, mounted outside the casing, operable between control positions corresponding to pressure changed levels; and means for operating the element, said means including connecting means transmitting movement, derived from the angular movement of said assembly in one direction, to operate the control element in one direction, said connecting means being operable independently of the vertical movement of the assembly.

13. The mechanism defined in claim 12 wherein the connecting means includes: an assembly actuated section mounted upon carrier for vertical movement with the carrier and assembly; and another section mounted upon the casing in position to be actuated horizontally by the assembly actuated section in all of its vertical positions.

14. The mechanism of claim 12 wherein the connecting means comprises: a distortable diaphragm forming part of the casing wall and being sufficiently rigid to resist bulging when its inner and outer faces are normally subjected to different operating pressures; inner means for distorting the diaphragm in response to angular assembly movement; and outer means for communicating the distortion of the diaphragm to the control element to operate the latter.

VERNER DAHLMAN.